US007562192B2

(12) United States Patent
Henry et al.

(10) Patent No.: US 7,562,192 B2
(45) Date of Patent: *Jul. 14, 2009

(54) MICROPROCESSOR, APPARATUS AND METHOD FOR SELECTIVE PREFETCH RETIRE

(75) Inventors: G. Glenn Henry, Austin, TX (US); Rodney E. Hooker, Austin, TX (US)

(73) Assignee: Centaur Technologies, Austin, TX (US)

( * ) Notice: Subject to any disclaimer, the term of this patent is extended or adjusted under 35 U.S.C. 154(b) by 387 days.

This patent is subject to a terminal disclaimer.

(21) Appl. No.: 11/563,379

(22) Filed: Nov. 27, 2006

(65) Prior Publication Data

US 2007/0083714 A1  Apr. 12, 2007

Related U.S. Application Data

(60) Division of application No. 11/198,988, filed on Aug. 8, 2005, now Pat. No. 7,240,163, which is a continuation of application No. 10/420,357, filed on Apr. 21, 2003, now Pat. No. 6,990,558.

(60) Provisional application No. 60/390,054, filed on Jun. 18, 2002.

(51) Int. Cl.
  *G06F 12/00* (2006.01)
(52) U.S. Cl. ............... 711/137; 711/118; 711/133; 711/159; 711/141; 711/204; 711/213; 712/207; 712/237
(58) Field of Classification Search ............ 711/118, 711/128, 133, 137, 141, 159, 204, 213; 712/207, 712/237
See application file for complete search history.

(56) References Cited

U.S. PATENT DOCUMENTS

| | | | |
|---|---|---|---|
| 5,752,261 A | 5/1998 | Cochcroft, Jr. | |
| 6,138,213 A | 10/2000 | McMinn | |
| 6,219,760 B1 | 4/2001 | McMinn | |
| 6,378,044 B1 | 4/2002 | Luce et al. | |
| 6,523,093 B1 | 2/2003 | Bogin et al. | |
| 7,062,607 B2 | 6/2006 | Solomon et al. | |
| 7,073,030 B2 * | 7/2006 | Azevedo et al. | ............. 711/136 |
| 2002/0129205 A1 | 9/2002 | Anderson et al. | |
| 2003/0154349 A1 | 8/2003 | Berg et al. | |
| 2007/0067577 A1 | 3/2007 | Henry et al. | |

* cited by examiner

*Primary Examiner*—Jasmine Song
(74) *Attorney, Agent, or Firm*—E. Alan Davis; James W. Huffman

(57) ABSTRACT

An apparatus in a microprocessor for selectively retiring a prefetched cache line is disclosed. The microprocessor includes a prefetch buffer that stores a cache line prefetched from a system memory coupled to the microprocessor. The microprocessor also includes a cache memory, comprising an array of storage elements for storing cache lines, indexed by an index input. One of the storage elements of the array indexed by an index portion of an address of the prefetched cache line stored in the prefetch buffer is storing a replacement candidate line for the prefetched cache line. The microprocessor also includes control logic that determines whether the replacement candidate line in the cache memory is invalid, and if so, replaces the replacement candidate line in the one of the storage elements with the prefetched cache line from the prefetch buffer.

27 Claims, 4 Drawing Sheets

Selective Prefetch Retire Operation (Alternate Embodiment)

Microprocessor with Apparatus for Selectively Retiring Prefetched Cache Line

Selective Prefetch Retire Operation

Microprocessor with Apparatus for Selectively Retiring Prefetched Cache Line (Alternate Embodiment)

Selective Prefetch Retire Operation (Alternate Embodiment)

MICROPROCESSOR, APPARATUS AND METHOD FOR SELECTIVE PREFETCH RETIRE

CROSS-REFERENCE TO RELATED APPLICATIONS

This application is a divisional of application Ser. No. 11/198,988, filed Aug. 8, 2005, which is a continuation of application Ser. No. 10/420,357, filed Apr. 21, 2003, which claims priority based on Provisional Application No. 60/390,054, filed Jun. 18, 2002.

BACKGROUND OF THE INVENTION

Field of the Invention

This invention relates in general to the field of cache memories, and particularly to cache line prefetching.

Modern computer systems include a microprocessor and a system memory for storing instructions to be executed by the microprocessor and data to be processed by the instructions. The time required to read data from the system memory is typically very large relative to the time the microprocessor spends executing one or more instructions to process the data—in some cases one or two orders of magnitude. Consequently, the processor may sit idle while the data is loaded from the system memory, which is very inefficient and degrades system performance.

To alleviate this problem, microprocessors include a cache memory. A cache memory is a memory within the processor smaller than the system memory that stores a subset of the system memory data. When the processor executes an instruction that references data, the processor first checks to see if the data is present in the cache, commonly referred to as a "cache hit," from a previous load of the data. If the load hits in the cache, then the instruction can be executed immediately. Otherwise, if the load "misses" the cache, the instruction must wait while the data is fetched from the system memory into the processor.

Microprocessor designers have recognized that software programs frequently access data and instructions sequentially. Hence, if a load misses in the cache, it is highly likely that the data at the memory addresses following the load miss address will be requested by the program in the near future. Consequently, a microprocessor may speculatively begin loading the next chunk of data after the missing data into the cache, even though the program has not yet requested the next data, in anticipation of a future need for the next chunk of data. This is commonly referred to as a prefetch.

The chunk of data prefetched is commonly the size of a cache line. Caches store data in cache lines. Common cache line sizes are 32 bytes or 64 bytes. A cache line is the smallest unit of data that can be transferred between the cache and the system memory. That is, when a microprocessor wants to read a cacheable piece of data missing in the cache, it reads from memory the entire cache line containing the missing piece of data and stores the entire cache line in the cache. Similarly, when a new cache line needs to be written to the cache that causes a modified cache line to be replaced, the microprocessor writes the entire replaced line to memory.

The conventional approach is to treat the prefetched cache line as an ordinary line fill. An ordinary line fill is a fetch of a cache line from system memory because an instruction accessed data in the cache line. With an ordinary line fill, the fetched cache line is unconditionally written, or retired, into the cache. A disadvantage of unconditionally retiring a speculatively prefetched cache line into the cache is that it potentially replaces a line in the cache that is currently being used or likely to be used in the near future, thereby potentially adversely affecting cache efficiency. A solution to this problem is needed in order to improve cache efficiency.

SUMMARY OF THE INVENTION

The present invention distinguishes a prefetched cache line from an ordinary cache line fill and selectively retires the prefetched cache line into the cache based upon contemporaneous accesses to the line in the cache that is the candidate for being replaced by the prefetched line. Accordingly, in attainment of the aforementioned object, it is a feature of the present invention to provide a method for selectively retiring a prefetched cache line from a prefetch buffer to a cache in a microprocessor. The method includes prefetching the prefetched cache line into the prefetch buffer in response to a miss in the cache. The method also includes receiving a request to prefetch a new cache line into the prefetch buffer. The method also includes determining whether a replacement candidate line in the cache is invalid. The method also includes replacing the replacement candidate line in the cache with the prefetched cache line if the replacement candidate line is invalid.

In another aspect, it is a feature of the present invention to provide a microprocessor. The microprocessor includes a prefetch buffer, configured to store a cache line prefetched from a system memory coupled to the microprocessor. The microprocessor also includes a cache memory, comprising an array of storage elements for storing cache lines. The array is indexed by an index input. One of the storage elements of the array indexed by an index portion of an address of the prefetched cache line stored in the prefetch buffer is storing a replacement candidate line for the prefetched cache line. The microprocessor also includes control logic, coupled to the cache memory and to the prefetch buffer, configured to determine whether the replacement candidate line in the cache memory is invalid, and if so, to replace the replacement candidate line in the one of the storage elements with the prefetched cache line from the prefetch buffer.

In another aspect, it is a feature of the present invention to provide a computer program product embodied on a computer-readable storage medium for use with a computing device including a computer-readable storage medium having computer-readable program code embodied in the medium for providing a microprocessor. The program code includes first program code for providing a prefetch buffer, configured to store a cache line prefetched from a system memory coupled to the microprocessor. The program code also includes second program code for providing a cache memory, comprising an array of storage elements for storing cache lines, wherein the array is indexed by an index input, wherein one of the storage elements of the array indexed by an index portion of an address of the prefetched cache line stored in the prefetch buffer is storing a replacement candidate line for the prefetched cache line. The program code includes third program code for providing control logic, coupled to the cache memory and to the prefetch buffer, configured to determine whether the replacement candidate line in the cache memory is invalid, and if so, to replace the replacement candidate line in the one of the storage elements with the prefetched cache line from the prefetch buffer.

An advantage of the present invention is that by adding a small amount of additional hardware we are able to potentially improve cache efficiency by decreasing the likelihood of detrimentally replacing a cache line that is more likely to be accessed in the near future than the prefetched line.

Other features and advantages of the present invention will become apparent upon study of the remaining portions of the specification and drawings.

DETAILED DESCRIPTION

Figure 1:
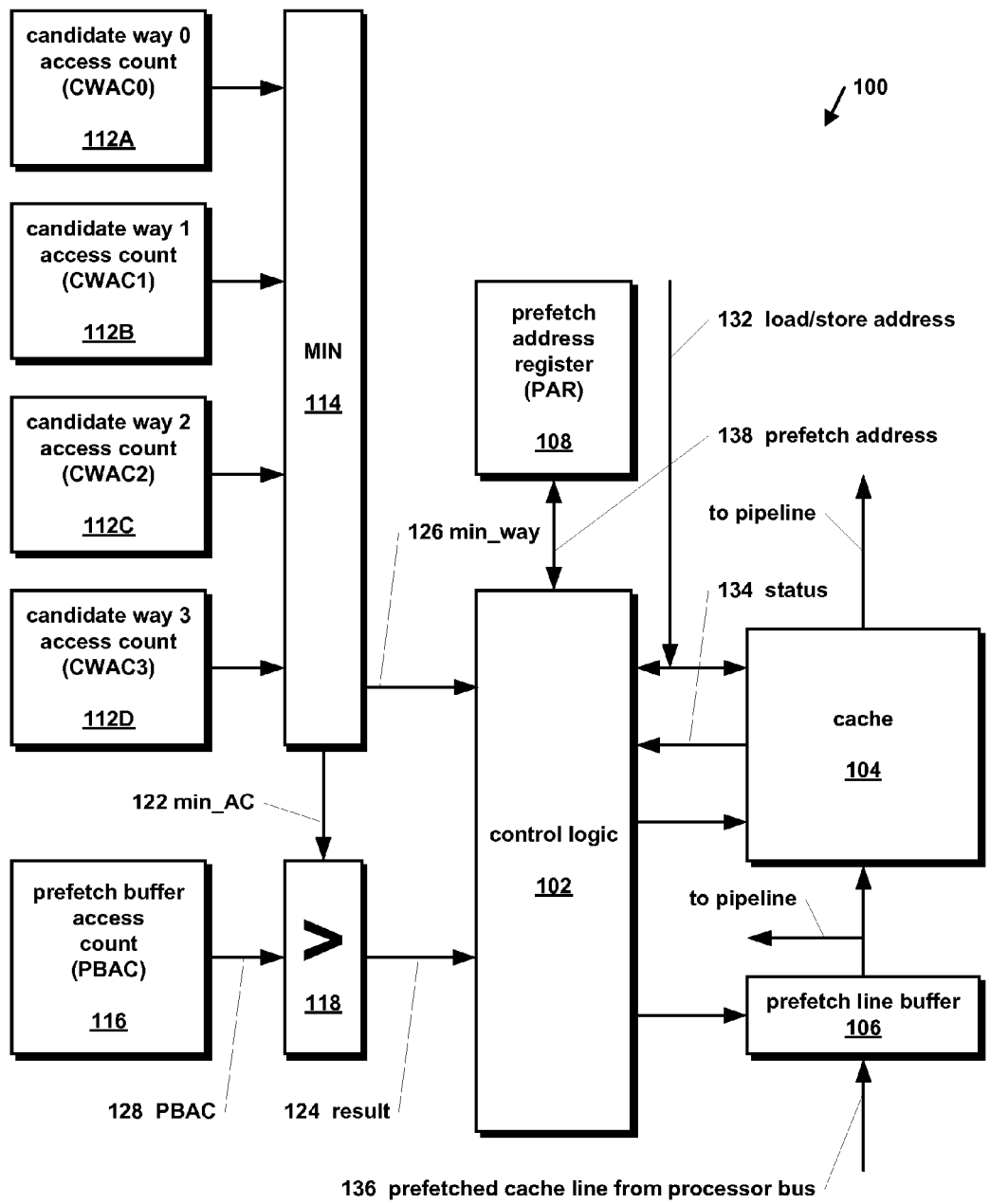
FIG. 1 is a block diagram of a microprocessor with an apparatus for selectively retiring prefetched cache lines according to the present invention.

Referring now to FIG. 1, a block diagram of a microprocessor 100 with an apparatus for selectively retiring prefetched cache lines according to the present invention is shown. Microprocessor 100 includes a plurality of stages coupled together to form a pipeline. One or more of the pipeline stages includes an address generator for generating a memory access operation address, referred to in FIG. 1 as load/store address 132. The load/store address 132 specifies the address of a load or store operation. A load operation reads data from memory into microprocessor 100, and a store operation writes data from microprocessor 100 to memory. In one embodiment, load/store address 132 is a physical memory address.

Microprocessor 100 also includes a cache memory 104, or cache 104. In one embodiment, cache 104 comprises a 64 KB 4-way set associative cache memory. In one embodiment, cache 104 is a level-1 data cache; however, the present invention is not limited to use with a data cache, but may be employed with an instruction cache or with a unified data/instruction cache. Additionally, the present invention is not limited to application with a level-1 cache, but may be employed with caches at any level of the cache hierarchy.

Cache 104 stores address tags and status of each cache line stored therein. The tags comprise an upper portion of the memory address of cache lines stored in cache 104. In one embodiment, the status comprises MESI (Modified/Exclusive/Shared/Invalid) protocol state information. Cache 104 receives load/store address 132. A lower portion of load/store address 132 is used to index into cache 104 to select a set, or row, of ways. Cache 104 compares the upper portion of load/store address 132 with the address tags of each way in the selected set so a determination may be made of whether load/store address 132 hits in the cache, i.e., whether load/store address 132 matches any tags present in cache 104 and has a valid status. Cache 104 outputs status information 134, which includes the MESI state of each way of the selected set, and an indication of whether any of the tags in the selected set match load/store address 132. If load/store address 132 is for a load operation causing a hit in cache 104, the hitting cache line data is provided to the stage of the microprocessor 100 pipeline requesting the cache line data.

Microprocessor 100 also includes control logic 102, coupled to cache 104. Control logic 102 receives status 134 from cache 104 and load/store address 132. Control logic 102 responsively generates control signals to control the operation of cache 104. Operation of control logic 102 will be described in more detail below.

Microprocessor 100 also includes a prefetch line buffer 106, coupled to cache 104. Prefetch buffer 106 receives a prefetched cache line 136 from a bus interface unit, which fetches data from a system memory into microprocessor 100 over a processor bus. As described below, if load/store address 132 misses in cache 104, control logic 102 causes a cache line following the cache line implicated by load/store address 132, i.e., prefetched cache line 136, to be prefetched from system memory into prefetch buffer 106. Advantageously, control logic 102 selectively retires the prefetched cache line 136 into cache 104 based on contemporaneous accesses to the prefetched cache line 136, as described below.

Prefetch buffer 106 provides the prefetched cache line 136 to cache 104. Additionally, prefetch buffer 106 provides the prefetched cache line 136 to one or more stages of the microprocessor 100 pipeline requesting data in the prefetched cache line 136. In this regard, prefetch line buffer 106 may be viewed as an extension of cache 104. That is, if control logic 102 determines that a load operation specifies a load/store address 132 that misses in cache 104 but hits in prefetch buffer 106, control logic 102 may provide data from the prefetched cache line 136 to a microprocessor 100 pipeline stage.

Microprocessor 100 also includes a prefetch address register (PAR) 108, coupled to control logic 102. PAR 108 stores the address of the prefetched cache line 136 stored in prefetch buffer 106, referred to as prefetch address 138. When control logic 102 causes the prefetched cache line 136 to be prefetched into prefetch buffer 106, control logic 102 updates PAR 108 with the prefetched cache line address 138. Additionally, control logic 102 compares PAR 108 with load/store address 132 to detect subsequent accesses to the prefetched cache line 136.

Microprocessor 100 also includes a prefetch buffer access count (PBAC) register 116, coupled to control logic 102. PBAC register 116 stores the number of accesses to the prefetched cache line 136 in prefetch buffer 106, referred to as PBAC 128. Control logic 102 increments PBAC register 116 when control logic 102 detects an access to the prefetched cache line 136. In one embodiment, an access includes a read of the prefetched cache line 136. However, other embodiments are contemplated in which accesses to the prefetched cache line 136 also include writes and/or snoop operations. Control logic 102 clears PBAC register 116 when a new prefetched cache line 136 is prefetched into prefetch buffer 106.

Microprocessor 100 also includes a plurality of candidate way access count (CWAC) registers 112, coupled to control logic 102. The embodiment of FIG. 1 includes four CWAC registers 112, denoted CWAC0 112A, CWAC1 112B, CWAC2 112C, and CWAC3 112D, corresponding to each of the four ways in 4-way set associative cache 104. Each of the CWAC registers 112 stores the number of accesses to the corresponding way of the candidate set. The candidate set is the set of ways in cache 104 selected by prefetch address 138. Control logic 102 increments one of the CWAC registers 112 when control logic 102 detects an access to the corresponding way of the selected set in cache 104. Control logic 102 clears the CWAC registers 112 when a new prefetched cache line 136 is prefetched into prefetch buffer 106.

Microprocessor 100 also includes minimum selection logic 114, coupled to CWAC registers 112. Minimum selection logic 114 receives the CWAC from each of the CWAC registers 112 and outputs the smallest value received from the CWAC registers 112, denoted min_AC 122. In addition, minimum selection logic 114 outputs to control logic 102 min_way signal 126, which specifies the way number having the smallest value received from the CWAC registers 112.

Microprocessor 100 also includes a comparator 118, coupled to minimum selection logic 114 and PBAC register 116. Comparator 118 compares min_AC 122 and PBAC 128, and generates a true value on result output 124 if PBAC 128 is greater than min_AC 122, and generates a false value otherwise. In another embodiment, comparator 118 compares min_AC 122 and PBAC 128, and generates a true value on result output 124 if PBAC 128 is greater than or equal to min_AC 122, and generates a false value otherwise. Result 124 is provided to control logic 102.

Figure 2:
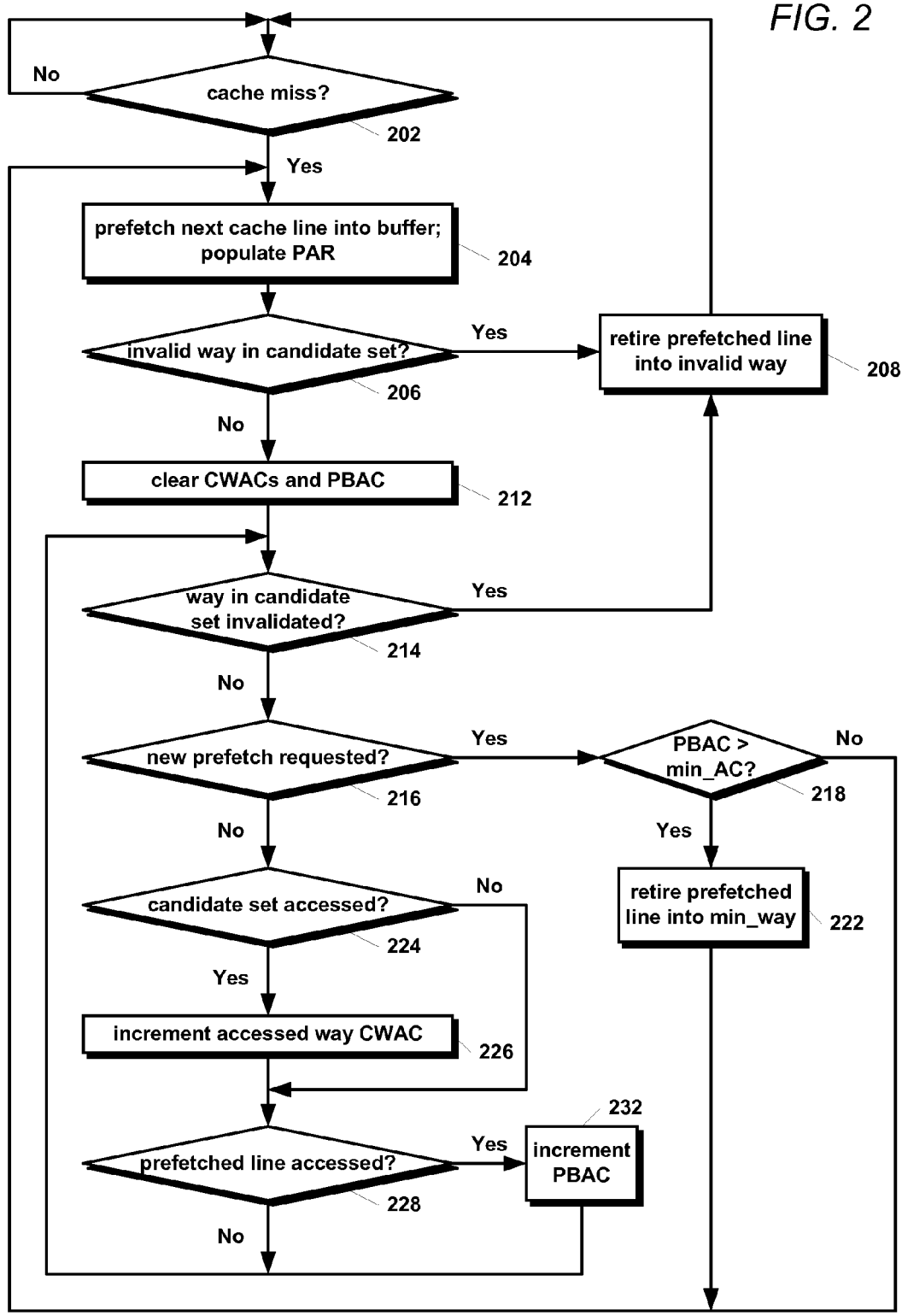
FIG. 2 is a flowchart illustrating operation of the microprocessor of FIG. 1 to selectively retire a prefetched cache line from the prefetch buffer into the cache according to the present invention.

Referring now to FIG. 2, a flowchart illustrating operation of microprocessor 100 of FIG. 1 to selectively retire a prefetched cache line from prefetch buffer 106 into cache 104 is shown. Flow begins at decision block 202.

At decision block 202, control logic 102 determines whether load/store address 132 misses in cache 104 by examining status signals 134 of FIG. 1. If so, flow proceeds from decision block 202 to block 204; otherwise, flow returns to decision block 202.

At block 204, after initiating a fetch of the missing cache line from memory into cache 104, control logic 102 instructs the bus interface unit to prefetch the next cache line after the cache line implicated by missing load/store address 132 into prefetch buffer 106 of FIG. 1. Before prefetching the next cache line into prefetch buffer 106, control logic 102 verifies that the next cache line is also missing in cache 104. When the prefetched cache line 136 has been prefetched into prefetch buffer 106, control logic 102 updates prefetch address register 108 with prefetch address 138 of FIG. 1, i.e., the address of the next cache line. Flow proceeds from block 204 to decision block 206.

At decision block 206, control logic 102 queries cache 104 with prefetch address 138 and determines whether any of the ways in the candidate set is invalid by examining status information 134 of FIG. 1. If so, flow proceeds from decision block 206 to block 208; otherwise, flow proceeds to block 212.

At block 208, control logic 102 retires the prefetched cache line 136 into the invalid way of the candidate set of cache 104. Flow returns from block 208 to decision block 202.

At block 212, control logic 102 clears to zero PBAC register 116 and CWAC registers 112 of FIG. 1. Flow proceeds from block 212 to decision block 214.

At decision block 214, as load/store operations access cache 104, control logic 102 determines whether any of the operations have invalidated any of the ways in the candidate set. For example, a way in the candidate set may be invalidated by an invalidating snoop access. If any of the ways in the candidate set have been invalidated, flow proceeds from decision block 214 to block 208; otherwise, flow proceeds to decision block 216.

At decision block 216, control logic 102 determines whether a new prefetch request has been made. That is, control logic 102 determines whether a new load/store address 132 has missed in cache 104 causing prefetch buffer 106 to be needed for prefetching a new cache line. If so, flow proceeds from decision block 216 to decision block 218; otherwise, flow proceeds to decision block 224.

At decision block 218, control logic 102 determines whether PBAC 128 is greater than min_AC 122 by examining result signal 124 of FIG. 1. If so, flow proceeds from decision block 218 to block 222. Otherwise, flow proceeds to block 204 such that the prefetched cache line 136 stored in prefetch buffer 106 is not retired into cache 104, but instead is discarded, i.e., subsequently overwritten by the new prefetched cache line.

At block 222, control logic 102 retires the prefetched cache line 136 into the way of the candidate set of cache 104 specified by min_way signal 126. Flow proceeds from block 222 to block 204.

At decision block 224, control logic 102 determines whether a way in the candidate set has been accessed by examining status information 134. In one embodiment, a way is accessed if load/store address 132 hits in cache 104, i.e., if the way has valid status and the tag of the way matches the tag portion of load/store address 132. If the candidate set has been accessed, flow proceeds from decision block 224 to block 226; otherwise flow proceeds to decision block 228.

At block 226, control logic 102 increments the CWAC register 112 corresponding to the accessed way determined at decision block 224. For example, if way 2 is accessed, then control logic 102 increments CWAC2 112C. Flow proceeds from block 226 to decision block 228.

At decision block 228, control logic 102 determines whether the prefetched cache line 136 has been accessed by comparing prefetch address 138 with load/store address 132. If so, flow proceeds from decision block 228 to block 232; otherwise flow proceeds to decision block 214.

At block 232, control logic 102 increments PBAC register 116. Flow proceeds from block 232 to decision block 214.

The pseudocode shown in Table 1 below also describes the operation of microprocessor 100 described in FIG. 2.

TABLE 1

```
if ( anyWayInCandidateSetInvalid ) {
    retirePrefetchedLineToCache( );
} else {
    PBAC = CWAC[0] = CWAC[1] = CWAC[2] = CWAC[3] = 0;
    while ( noNewPrefetchRequested &&
    noWayInCandidateSetInvalidated ) {
        if ( candidateSetAccessed )
            CWAC[accessedWay]++;
        if ( PrefetchedLineAccessed )
            PBAC++;
    }
    if (newPrefetchRequested ) {
        if ( PBAC > min_AC )
            RetirePrefetchedLineToCache( );
        else   /* throw away prefetched cache line */
            OverwritePrefetchBufferWithNewPrefetchData( );
    } else {      /* way in candidate set was invalidated */
        RetirePrefetchedLineToCache( );
    }
}
```

As may be observed from FIGS. 1 and 2, the present invention advantageously selectively retires the prefetched cache line 136 into cache 104, based on the number of times the prefetched cache line 136 is accessed relative to the number of times the ways of the candidate set is accessed, rather than indiscriminately retiring the prefetched cache line 136 into cache 104.

Figure 3:
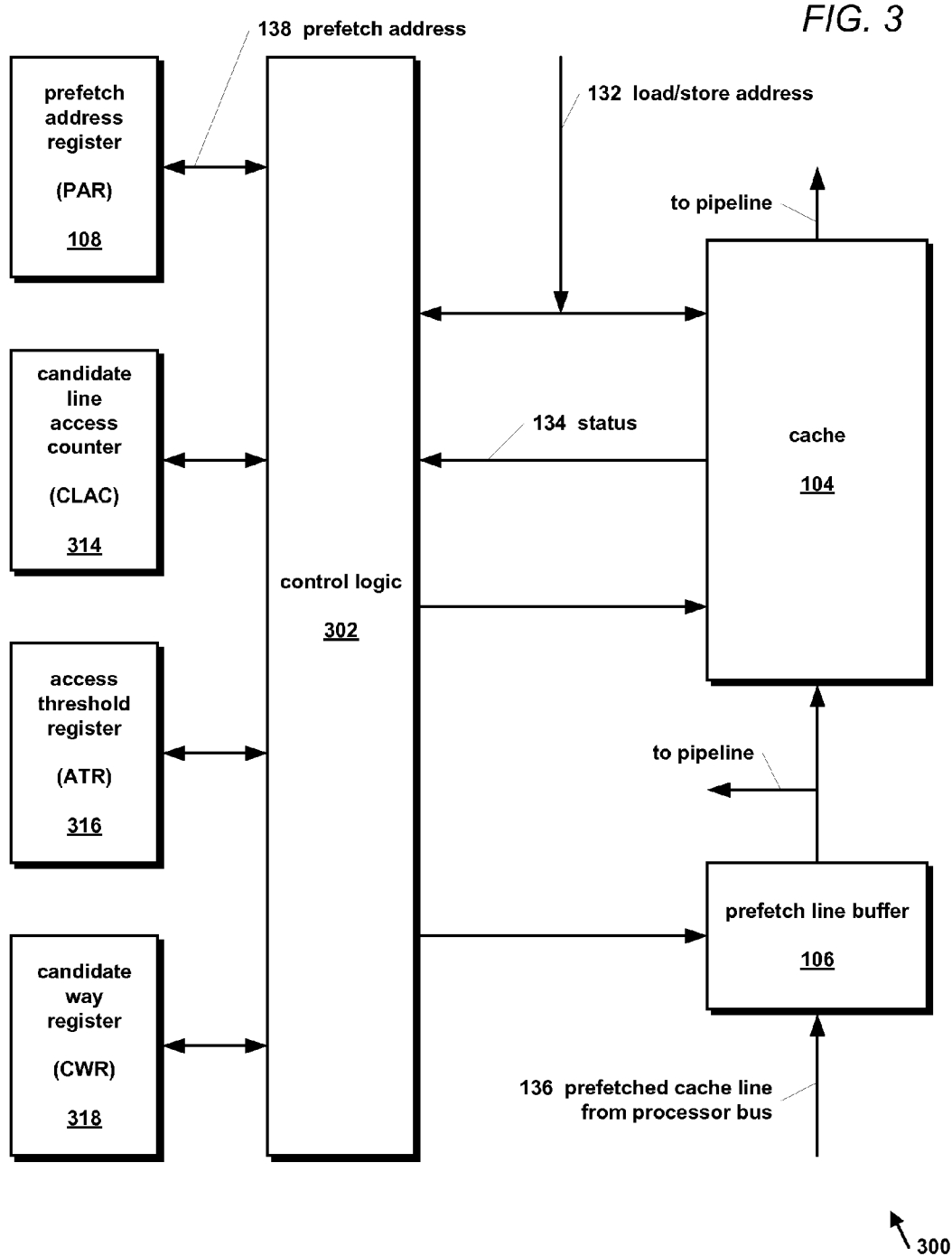
FIG. 3 is a block diagram of a microprocessor with an apparatus for selectively retiring prefetched cache lines according to an alternate embodiment of the present invention.

Referring now to FIG. 3, a block diagram of a microprocessor 300 with an apparatus for selectively retiring prefetched cache lines according to an alternate embodiment of the present invention is shown.

Microprocessor 300 includes a cache 104, prefetch buffer 106, prefetch address register (PAR) 108, load/store address 132, status information 134, prefetched cache line 136, and prefetch address 138 similar to like-numbered items of FIG. 1.

Microprocessor 300 also includes control logic 302 similar to control logic 102 of FIG. 1 and similarly coupled to cache 104 and prefetch buffer 106; however, control logic 302 of FIG. 3 operates to selectively retire prefetched cache line 136 into cache 104 based on values stored in a candidate line access counter (CLAC) register 314, an access threshold register (ATR) 316, and a candidate way register (CWR) 318, all coupled to control logic 302.

CWR 318 stores a value specifying the candidate way, which is the way of the candidate set to be selectively replaced by prefetched cache line 136. In one embodiment, initially, control logic 302 populates CWR 318 with the least-recently-used way of the candidate set determined from status information 134. If the candidate way is replaced before a new prefetch is requested, control logic 302 updates CWR 318 with the new least-recently-used way.

CLAC 314 stores a count of the number of times the candidate line, or candidate way, specified in CWR 318 has been accessed since prefetched cache line 136 was prefetched into prefetch buffer 106.

ATR 316 stores a threshold value used by control logic 302 to compare with the value stored in CLAC 314 to selectively retire the prefetched cache line 136, as described below. In one embodiment, the value stored in ATR 316 is predetermined. In one embodiment, the value stored in ATR 316 is programmable.

Figure 4:
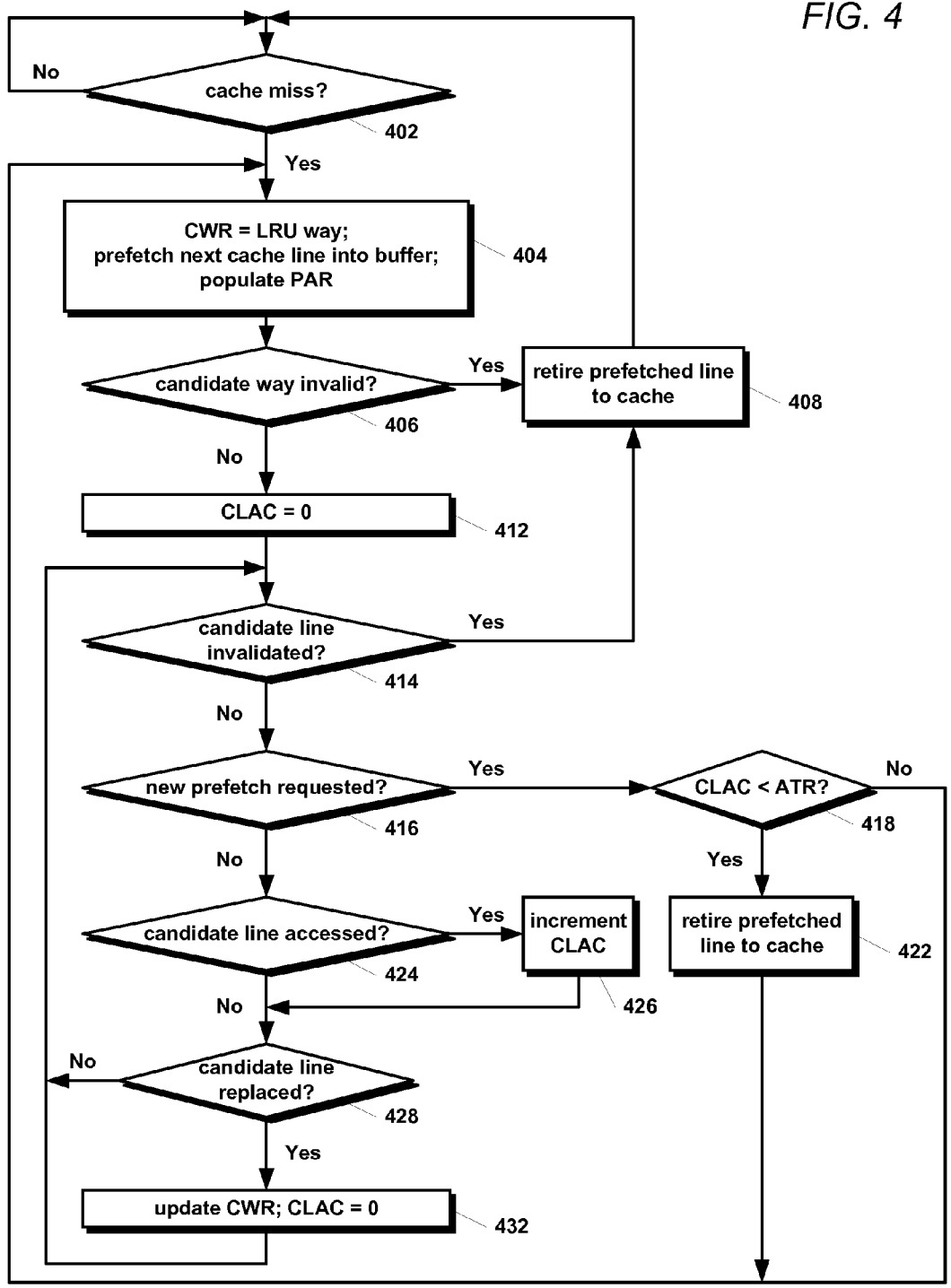
FIG. 4 is a flowchart illustrating operation of the microprocessor of FIG. 3 to selectively retire a prefetched cache line from the prefetch buffer into the cache according to an alternate embodiment of the present invention.

Referring now to FIG. 4, a flowchart illustrating operation of microprocessor 300 of FIG. 3 to selectively retire a prefetched cache line from prefetch buffer 106 into cache 104 is shown. Flow begins at decision block 402.

At block 402, control logic 302 determines whether load/store address 132 misses in cache 104 by examining status signals 134 of FIG. 3. If so, flow proceeds from decision block 402 to block 404; otherwise, flow returns to decision block 402.

At block 404, after initiating a fetch of the missing cache line from memory into cache 104, control logic 302 populates CWR 318 with a value specifying the least-recently-used way of the candidate line. Furthermore, control logic 302 instructs the bus interface unit to prefetch the next cache line after the cache line implicated by missing load/store address 132 into prefetch buffer 106 of FIG. 1. Before prefetching the next cache line into prefetch buffer 106, control logic 102 verifies that the next cache line is also missing in cache 104. Additionally, control logic 302 populates prefetch address register 108 with the address of the next cache line after the missing cache line. Flow proceeds from block 404 to decision block 406.

At decision block 406, control logic 302 queries cache 104 with prefetch address 138 and determines whether any of the ways in the candidate set is invalid by examining status information 134 of FIG. 3. If so, flow proceeds from decision block 406 to block 408; otherwise, flow proceeds to block 412.

At block 408, control logic 302 retires the prefetched cache line 136 into the candidate way of cache 104 specified in CWR 318. Flow returns from block 408 to decision block 402.

At block 412, control logic 302 clears to zero CLAC 314 of FIG. 3. Flow proceeds from block 412 to decision block 414.

At decision block 414, as load/store operations access cache 104, control logic 302 determines whether any of the operations have invalidated the candidate way. If so, flow proceeds from decision block 414 to block 408; otherwise, flow proceeds to decision block 416.

At decision block 416, control logic 302 determines whether a new prefetch request has been made. If so, flow proceeds from decision block 416 to decision block 418; otherwise, flow proceeds to decision block 424.

At decision block 418, control logic 302 determines whether the value stored in CLAC 314 is greater than the value stored in ATR 316 of FIG. 3. If so, flow proceeds from decision block 418 to block 422. Otherwise, flow proceeds to block 404 such that the prefetched cache line 136 stored in prefetch buffer 106 is not retired into cache 104, but instead is discarded, i.e., subsequently overwritten by the new prefetched cache line.

At block 422, control logic 302 retires the prefetched cache line 136 into the candidate way of cache 104 specified by CWR 318. Flow proceeds from block 422 to block 404.

At decision block 424, control logic 302 determines whether the candidate way has been accessed by examining status information 134. In one embodiment, the candidate way is accessed if the candidate way has valid status and the tag of the way matches the tag portion of load/store address 132. If so, flow proceeds from decision block 424 to block 426; otherwise flow proceeds to decision block 428.

At block 426, control logic 302 increments the CLAC 314. Flow proceeds from block 426 to decision block 428.

At decision block 428, control logic 302 determines whether the candidate way has been replaced by a store operation. If so, flow proceeds from decision block 428 to block 432; otherwise flow proceeds to decision block 414.

At block 432, control logic 302 updates CWR 318 with the new least-recently-used way in the candidate set and clears to zero CLAC 314. Flow proceeds from block 432 to decision block 414.

The pseudocode shown in Table 2 below also describes the operation of microprocessor 300 described in FIG. 4.

TABLE 2

```
if ( Cache[PrefetchIndex][CandidateWay].Valid == 0 ) {
    RetirePrefetchToCache( );
} else {
    CandidateLineAccessCount = 0;
    while ( ! NewPrefetchRequest && ! CandidateLineInvalidated ) {
        if ( CandidateLineAccessed ) {
            CandidateLineAccessCount++;
        } else if ( CandidateLineInvalidated ) {  /* e.g., by external snoop */
            RetirePrefetchToCache( );
        } else if ( CandidateLineReplaced ) {  /* i.e., with valid miss data */
            UpdateCandidateWayRegister( );
            CandidateLineAccessCount = 0;
        }
    }
    if ( ( CandidateLineAccessCount < AccessThreshold ) &&
         ( ! CandidateLineInvalidated) )
    {
        RetirePrefetchToCache( );
    } else {
        OverWritePrefetchBufferWithNewPrefetchData( );
        /* i.e., flush old prefetch data */
    }
}
```

Although the present invention and its objects, features, and advantages have been described in detail, other embodiments are encompassed by the invention. For example, the present invention is suitable for use with a data cache or an instruction cache or a combined instruction/data cache. Furthermore, although an embodiment has been described in which accesses to the prefetched cache line and replacement candidate lines are tracked after the prefetched line is fetched into the prefetch buffer, other contemporaneous accesses may be tracked and used as a basis for selectively retiring the prefetched cache line, such as including accesses to candidate lines and/or the prefetched line between the time the need to prefetch is identified and the time the prefetched line arrives in the prefetch buffer. Additionally, reads, writes, snoops, and various access combinations thereof may be tracked for use in selectively retiring the prefetched cache line. That is, various heuristics may be embodied to determine whether the prefetched cache line or a replacement candidate line in the cache has a higher probability of being accessed in the future, which is more advantageous than the conventional method of unconditionally retiring the prefetched cache line into the cache. Finally, although the invention has been described with respect to prefetches generated by a miss of the cache, the invention is adaptable to use with any type of prefetch, such as a prefetch generated by a prefetch program instruction.

In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code (e.g., as part of an IP (intellectual property) core, such as a microprocessor core, or as a system-level design, such as a System on Chip (SOC)) and transformed to hardware as part of the production of integrated circuits. Also, the invention may be embodied as a combination of hardware and computer code.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A method for selectively retiring a prefetched cache line from a prefetch buffer to a cache in a microprocessor, the cache comprising an array of storage elements for storing cache lines, the method comprising:
   prefetching the prefetched cache line into the prefetch buffer in response to a miss in the cache;
   receiving a request to prefetch a new cache line into the prefetch buffer;
   determining whether a replacement candidate line in one of the storage elements in the cache is invalid;
   replacing said replacement candidate line in the cache with the prefetched cache line if said replacement candidate line is invalid;
   counting a number of accesses to the replacement candidate line in the cache, after said prefetching the prefetched cache line into the prefetch buffer;
   determining whether the replacement candidate line in the cache memory is valid, in response to said receiving a request to prefetch a new cache line into the prefetch buffer; and
   if the replacement candidate line in the cache memory is valid, selectively replacing the replacement candidate line in the one of the storage elements with the prefetched cache line from the prefetch buffer based on the number of accesses to the replacement candidate line.

2. The method of claim 1, wherein said determining is performed in response to a request to overwrite the prefetched cache line in the prefetch buffer.

3. The method of claim 2, further comprising:
   replacing the prefetched cache line in the prefetch buffer without retiring the prefetched cache line into the cache if said replacement candidate line is valid.

4. The method of claim 1, wherein the cache memory comprises a set associative memory, wherein each of the storage elements of the array comprises an N-way storage element configured to store N cache lines, the method further comprising:
   storing into a register a value specifying which one of the N-ways of the storage element is storing the replacement candidate line.

5. The method of claim 4, wherein said storing comprises:
   storing into the register the value specifying the one of the N-ways of the storage element which has been least-recently-used at the time the prefetched cache line is prefetched into the prefetch buffer.

6. The method of claim 1, wherein the cache memory comprises a set associative memory, wherein each of the storage elements of the array comprises an N-way storage element configured to store N cache lines, wherein said replacing comprises:
   replacing any of the N-ways whose cache line is invalid with the prefetched cache line from the prefetch buffer.

7. The method of claim 1, further comprising:
   if the replacement candidate line in the cache memory is valid:
      refraining from replacing the replacement candidate line with the prefetched cache line from the prefetch buffer if the number of accesses to the replacement candidate line is greater than a threshold value; and
      otherwise, replacing the replacement candidate line in the one of the storage elements with the prefetched cache line from the prefetch buffer.

8. The method of claim 7, wherein the threshold value is zero.

9. The method of claim 7, wherein the threshold value is a predetermined value.

10. The method of claim 7, wherein the threshold value is a programmable.

11. The method of claim 1, further comprising:
    counting a number of accesses to the prefetched line in the prefetch buffer, after said prefetching the prefetched cache line into the prefetch buffer;
    determining whether the number of accesses to the prefetched cache line is greater than the number of accesses to the replacement candidate line; and
    if the replacement candidate line in the cache memory is valid, replacing the replacement candidate line in the one of the storage elements with the prefetched cache line from the prefetch buffer if the number of accesses to the prefetched cache line is greater than the number of accesses to the replacement candidate line.

12. The method of claim 1, wherein the prefetch buffer is globally shared by the array of storage elements of the cache memory.

13. A microprocessor, comprising:
- a prefetch buffer, configured to store a cache line prefetched from a system memory coupled to the microprocessor;
- a cache memory, comprising an array of storage elements for storing cache lines, wherein said array is indexed by an index input, wherein one of said storage elements of said array indexed by an index portion of an address of said prefetched cache line stored in said prefetch buffer is storing a replacement candidate line for said prefetched cache line;
- control logic, coupled to said cache memory and to said prefetch buffer, configured to determine whether said replacement candidate line in said cache memory is invalid, and if so, to replace said replacement candidate line in said one of said storage elements with said prefetched cache line from said prefetch buffer; and
- a counter, coupled to said control logic, configured to count a number of accesses to the replacement candidate line in the cache after said prefetched cache line is prefetched into said prefetch buffer;
- wherein if said replacement candidate line in said cache memory is valid when said control logic receives a subsequent request to prefetch another cache line into said prefetch buffer, said control logic is configured to replace said replacement candidate line in said one of said storage elements with said prefetched cache line from said prefetch buffer based on said number of accesses to the replacement candidate line.

14. The microprocessor of claim 13, wherein said control logic is configured to determine whether said replacement candidate line in said cache memory is invalid after prefetching said prefetched cache line into said prefetch buffer.

15. The microprocessor of claim 13, wherein said control logic is configured to determine whether said replacement candidate line in said cache memory is invalid after receiving a request to prefetch another cache line into said prefetch buffer subsequent to prefetching said prefetched cache line into said prefetch buffer.

16. The microprocessor of claim 13, wherein said cache memory comprises a set associative memory, wherein each of said storage elements of said array comprises an N-way storage element configured to store N cache lines, wherein the microprocessor further comprises:
- a register, coupled to said control logic, configured to store a value specifying which one of said N-ways of said storage element is storing said replacement candidate line.

17. The microprocessor of claim 16, wherein said control logic is configured to store said value into said register specifying said one of said N-ways which is least-recently-used when said prefetched cache line is prefetched into said prefetch buffer.

18. The microprocessor of claim 13, wherein said cache memory comprises a set associative memory, wherein each of said storage elements of said array comprises an N-way storage element configured to store N cache lines, wherein said control logic is configured to replace any of said N-ways whose cache line is invalid with said prefetched cache line from said prefetch buffer.

19. The microprocessor of claim 13, wherein if said replacement candidate line in said cache memory is valid when said control logic receives a subsequent request to prefetch another cache line into said prefetch buffer, said control logic is configured to:
- refrain from replacing said replacement candidate line with said prefetched cache line from said prefetch buffer if said number of accesses to the replacement candidate line is greater than a threshold value; and
- otherwise, replace said replacement candidate line in said one of said storage elements with said prefetched cache line from said prefetch buffer.

20. The microprocessor of claim 19, wherein said threshold value is zero.

21. The microprocessor of claim 19, wherein said threshold value is a predetermined value.

22. The microprocessor of claim 19, wherein said threshold value is a programmable.

23. The microprocessor of claim 13, further comprising:
- a second counter, coupled to said control logic, configured to count a number of accesses to the prefetched line in the prefetch buffer, after said prefetching;
- wherein if said replacement candidate line in said cache memory is valid when said control logic receives a subsequent request to prefetch another cache line into said prefetch buffer, said control logic is configured to replace said replacement candidate line in said one of said storage elements with said prefetched cache line from said prefetch buffer if the number of accesses to the prefetched cache line is greater than the number of accesses to the replacement candidate line.

24. The microprocessor of claim 13, wherein said prefetch buffer is globally shared by the array of storage elements of said cache memory.

25. A computer program product embodied on a computer-readable storage medium for use with a computing device, comprising:
- a computer-readable storage medium, having computer-readable program code embodied in said medium for providing a microprocessor, said program code comprising:
  - first program code for providing a prefetch buffer, configured to store a cache line prefetched from a system memory coupled to the microprocessor;
  - second program code for providing a cache memory, comprising an array of storage elements for storing cache lines, wherein said array is indexed by an index input, wherein one of said storage elements of said array indexed by an index portion of an address of said prefetched cache line stored in said prefetch buffer is storing a replacement candidate line for said prefetched cache line;
  - third program code for providing control logic, coupled to said cache memory and to said prefetch buffer, configured to determine whether said replacement candidate line in said cache memory is invalid, and if so, to replace said replacement candidate line in said one of said storage elements with said prefetched cache line from said prefetch buffer; and
  - fourth program code for providing a counter, coupled to said control logic, configured to count a number of accesses to the replacement candidate line in the cache after said prefetched cache line is prefetched into said prefetch buffer;

wherein if said replacement candidate line in said cache memory is valid when said control logic receives a subsequent request to prefetch another cache line into said prefetch buffer, said control logic is configured to replace said replacement candidate line in said one of said storage elements with said prefetched cache line from said prefetch buffer based on said number of accesses to the replacement candidate line.

26. The computer program product of claim 25, wherein said cache memory comprises a set associative memory, wherein each of said storage elements of said array comprises an N-way storage element configured to store N cache lines, the computer program product further comprising:
fourth program code for providing a register, coupled to said control logic, configured to store a value specifying which one of said N-ways of said storage element is storing said replacement candidate line.

27. The computer program product of claim 25, further comprising:
fifth program code for providing a second counter, coupled to said control logic, configured to count a number of accesses to the prefetched line in the prefetch buffer, after said prefetching;
wherein if said replacement candidate line in said cache memory is valid when said control logic receives a subsequent request to prefetch another cache line into said prefetch buffer, said control logic is configured to replace said replacement candidate line in said one of said storage elements with said prefetched cache line from said prefetch buffer if the number of accesses to the prefetched cache line is greater than the number of accesses to the replacement candidate line.

* * * * *

UNITED STATES PATENT AND TRADEMARK OFFICE
CERTIFICATE OF CORRECTION

PATENT NO. : 7,562,192 B2 Page 1 of 1
APPLICATION NO. : 11/563379
DATED : July 14, 2009
INVENTOR(S) : Henry et al.

It is certified that error appears in the above-identified patent and that said Letters Patent is hereby corrected as shown below:

On the Title Page, item (73), Assignee should read: IP-First, LLC., Fremont, CA

Signed and Sealed this

Nineteenth Day of January, 2010

David J. Kappos
*Director of the United States Patent and Trademark Office*